United States Patent [19]

Czech et al.

[11] Patent Number: 6,156,133
[45] Date of Patent: Dec. 5, 2000

[54] METHOD FOR MANUFACTURING A PRODUCT WITH A METALLIC BASIC BODY

[75] Inventors: Norbert Czech, Dorsten; Knut Halberstadt, Mülheim, both of Germany

[73] Assignee: Siemens Aktiengesellschaft, Munich, Germany

[21] Appl. No.: 09/301,969

[22] Filed: Apr. 29, 1999

Related U.S. Application Data

[62] Division of application No. 09/013,294, Jan. 26, 1998, Pat. No. 5,967,755, which is a continuation of application No. PCT/DE96/01207, Jul. 5, 1996.

[30] Foreign Application Priority Data

Jul. 25, 1995 [DE] Germany ............................ 195 27 149

[51] Int. Cl.$^7$ ...................................................... C21D 1/26
[52] U.S. Cl. ........................ 148/525; 148/526; 148/527; 148/537
[58] Field of Search .................................. 148/518, 524, 148/525, 526, 527, 537

[56] References Cited

U.S. PATENT DOCUMENTS

| | | |
|---|---|---|
| 3,849,865 | 11/1974 | Gedwill et al. . |
| 4,031,274 | 6/1977 | Bessen . |
| 4,208,453 | 6/1980 | Baldi . |
| 4,405,660 | 9/1983 | Ulion et al. . |
| 4,576,874 | 3/1986 | Spengler et al. . |
| 4,880,614 | 11/1989 | Strangmann et al. . |
| 5,238,752 | 8/1993 | Duderstadt et al. . |

FOREIGN PATENT DOCUMENTS

| | | |
|---|---|---|
| 0 253 754 A1 | 1/1988 | European Pat. Off. . |
| 0 386 618 A1 | 9/1990 | European Pat. Off. . |
| 0 412 397 A1 | 2/1991 | European Pat. Off. . |
| 0 494 389 A1 | 7/1992 | European Pat. Off. . |
| 0 532 255 A1 | 3/1993 | European Pat. Off. . |
| 0 397 731 B1 | 4/1993 | European Pat. Off. . |
| 0 587 341 A1 | 3/1994 | European Pat. Off. . |
| 0 486 489 B1 | 11/1994 | European Pat. Off. . |
| 27 07 225 C2 | 12/1982 | Germany . |
| 33 29 907 A1 | 5/1984 | Germany . |
| 30 06 103 C2 | 7/1989 | Germany . |
| 41 02 033 A1 | 12/1991 | Germany . |
| 41 03 994 A1 | 8/1992 | Germany . |
| 41 19 967 C1 | 9/1992 | Germany . |
| 42 26 272 C1 | 2/1994 | Germany . |
| 43 10 896 C1 | 3/1994 | Germany . |

OTHER PUBLICATIONS

Japanese Patent Abstract No. 06306568 (Tadayoshi et al.), dated Nov. 1, 1994.
International Patent Application WO 89/07159 (Schmitz et al.), dated Aug. 10, 1989.
International Patent Application WO 93/18199 (Rickerby), dated Sep. 16, 1993.
Eckhardt Henrich: "Cooling of Gas Turbine Components Subject to High Thermal Loads", MTU Focus Jan. 1995, pp. 27–32.

*Primary Examiner*—Deborah Yee
*Attorney, Agent, or Firm*—Herbert L. Lerner; Laurence A. Greenberg; Werner H. Stemer

[57] ABSTRACT

A method for manufacturing a product that includes a metallic basic body with at least one longitudinal duct disposed therein and with a number of transverse ducts branching off from the longitudinal duct. A covering layer lies on the outside of the basic body. The covering layer serves as a protective or adhesive layer. An enrichment layer covers walls of the longitudinal duct and of the transverse ducts and parts of the covering layer. A ceramic heat-insulating layer can also be provided on the outside.

16 Claims, 4 Drawing Sheets

METHOD FOR MANUFACTURING A PRODUCT WITH A METALLIC BASIC BODY

CROSS-REFERENCE TO RELATED APPLICATION

This application is a divisional of application Ser. No. 09/013,294, filed Jan. 26, 1998, now U.S. Pat. No. 5,967,755 issued Oct. 19, 1999 which was a continuation of International Application PCT/DE96/01207, filed Jul. 5, 1996, which designated the United States.

BACKGROUND OF THE INVENTION

Field of the Invention

The invention relates to a product with a metallic basic body, at least one longitudinal duct located inside the basic body and a number of transverse ducts branching off from the longitudinal duct and each having an associated outlet orifice in the basic body. The invention relates, moreover, to a method for manufacturing such a product. At the same time, the invention relates particularly to such a product which is constructed as a gas turbine component, especially as a blade.

In the case of stationary gas turbines (with previously conventional material temperatures of approximately 950° C.) and gas turbines in aircraft engines (with previously conventional inlet temperatures of approximately 1100° C.), an increase in inlet temperature has been achieved by the use of specially developed alloys as basic materials for parts subjected to high thermal load, such as guide blades, moving blades, heat-shield elements and the like. Metal temperatures of well above 1000° C. can now be employed particularly as a result of the use of monocrystalline superalloys. The thermodynamic efficiency of a gas turbine can thereby be increased.

In addition to thermomechanical stresses, the components of gas turbines are also exposed to chemical attacks, for example by flue gases at temperatures of up to and above 1300° C. In order to provide sufficient resistance to such attacks, such a component is covered with a metallic protective layer. The protective layer must also have sufficiently good mechanical properties. Particularly in view of the mechanical interaction between the protective layer and the basic material of the component, the protective layer should be sufficiently ductile to be capable of matching possible deformations of the basic material. It should also be as unsusceptible to cracking as possible, as a prevention from being laid bare, along with subsequent corrosion and oxidation of the basic material.

Metallic protective layers for metallic components, especially for components of gas turbines, which are used for increasing resistance to corrosion and/or to oxidation, are known in a wide diversity in the prior art. One class of alloys for protective layers is known by the collective term "MCrAlY alloys", with M standing for at least one of the elements from the group including iron (Fe), cobalt (Co) and nickel (Ni), and further essential constituents being chromium (Cr), aluminum (Al) and yttrium (Y).

A protective layer composed of an MCrAlY alloy, which improves the corrosion and oxidation properties of a product within a surface temperature range of 600 to 1150° C., is described in Published European Patent Application 0 412 397 A1. The protective layer has a fraction of 1–20% rhenium in addition to 22–60% chromium, 0–15% aluminum, 0.3–2% yttrium or 0.3–2% of another element from the rare-earth group. The basis of the alloy is nickel and if appropriate, further elements may be added, especially cobalt. Due to the good thermal conductivity of the metallic protective layer, the component covered with the protective layer is exposed to virtually the same thermal load as the protective layer itself.

A further corrosion-resistant protective coating for components of gas turbines and further components formed of nickel-based or cobalt-based alloys is known from European Patent 0 486 489 B 1. That protective coating contains the following elements (given in parts by weight): 25–40% nickel, 28–32% chromium, 7–9% aluminum, 1–2% silicon, at least 5% cobalt, and 0.3–1% rare earths, especially yttrium. The properties of the individual constituents are specified explicitly in that publication.

A two-ply metallic protective layer composed of two different alloys is described in European Patent 0 397 731 B1, corresponding to U.S. Pat. No. 5,499,905. The outer alloy is an MCrAlY alloy and contains (given in parts by weight) 15–40% chromium, 3–15% aluminum and 0.2–3% of at least one element from the group including yttrium, tantalum, hafnium, scandium, zirconium, niobium and silicon. That outer alloy is itself covered with a thermal barrier layer for protection against particularly high temperatures, if appropriate, particularly in the case of internally cooled metal articles. The thermal barrier layer can be zirconium oxide with an addition of yttrium oxide. Oxidation of the outer alloy before the application of the thermal barrier layer is provided in order to prevent the thermal barrier layer from possibly flaking off from the outer alloy.

In the prior art, it is also known, in the case of a turbine blade, to carry out an internal coating of the relatively narrow cooling ducts with a metal, for example with aluminum (see the paper by J. E. Restall et al., entitled "A Process for Protecting Gas Turbine Blade Cooling Passages Against Degradation", Superalloys, 1980, pp. 405–410). A further method for depositing aluminum on a nickel compound, which method can also be used for inner surfaces and cooling ducts, is also described in the literature (a paper by R. S. Parzuchowski: entitled "Gas Phase Deposition of Aluminum of Nickel Alloys", in Thin Solid Films 45, 1977, pp. 349–355). The use of chromium or of a combination of aluminum and chromium is also possible. Reference must additionally be made to German Patent DE 41 19 967 C1. It may be stated that the prior art generally only knows of internal coatings for cooling ducts together with identical external coatings.

Blades for highly developed gas turbines, for example for aircraft engines, and increasingly for stationary gas turbines as well, are nowadays of complex construction. A distinction can, in that case, be made between the following features: a metallic basic body, that is to say the actual blade, is cast hollow and thin-walled from a high-temperature material. Efficient cooling through the use of a cooling medium, especially a gas, such as air, from the inside of the blade is thereby to become possible. For that purpose the basic body has at least one longitudinal cooling duct and a number of transverse cooling ducts branching off therefrom.

A coating which protects the metallic basic body against oxidation and high-temperature corrosion is provided on the hot-gas side of the blade. In many instances, there is, on the coating, a further coating located on the hot gas side and formed of a ceramic material, for the purpose of reducing the heat flux in the blade. An internal coating is also desirable for protection against an oxidation-related weakening of the wall thickness and the initiation of cracking on the coolant side. In that case, the transverse cooling ducts may be considered as perforations in the blade leaf and/or the platform or platforms, with the cooling medium emerging through those perforations. Particularly good distribution and, where appropriate, the formation of a cooling-medium mist on the hot-gas side as well can be achieved thereby. That mist leads to film cooling.

SUMMARY OF THE INVENTION

It is accordingly an object of the invention to provide a product with a metallic basic body and a method for manufacturing such a product, which overcome the hereinaforementioned disadvantages of the heretofore-known products and methods of this general type, in which the product is capable of being manufactured cost-effectively and having an external and an internal coating, and in which the manufacturing method is cost-effective and, in particular, provides all transverse ducts with a coating, without the cross-section thereof being narrowed in an uncontrolled manner.

With the foregoing and other objects in view there is provided, in accordance with the invention, a product, comprising a metallic basic body formed of an alloy and having an outside; the basic body having at least one longitudinal duct formed therein, a number of transverse ducts branching off from the longitudinal duct in the basic body, and outlet orifices each associated with a respective one of the transverse ducts in the basic body; a metallic covering layer applied directly onto the outside of the basic body and having an alloy different from the alloy of the basic body; and a metallic enrichment layer covering the basic body only in the longitudinal duct and in the transverse ducts, forming a coated longitudinal cooling duct and a number of coated transverse cooling ducts branching off from the coated longitudinal cooling duct, for passage of a cooling medium flow through the coated longitudinal and transverse cooling ducts, and the enrichment layer additionally covering a small part of the covering layer at each of the outlet orifices.

In accordance with another feature of the invention, the covering layer is formed of an MCrAlY alloy and, furthermore, has a thickness of 180 $\mu$m to 300 $\mu$m. In particular, the alloys known from Published European Patent Application 0 412 397 A1 and European Patent 0 486 489 B1 come into consideration as an MCrAlY alloy.

In accordance with a further feature of the invention, the enrichment layer on the product has a thickness of 30 $\mu$m to 100 $\mu$m.

In accordance with an added feature of the invention, the enrichment layer is constructed as a diffusion layer, that is to say as a layer which is formed in the basic body by diffusing-in a separately applied metal.

In accordance with an additional feature of the invention, in particular aluminum, chromium and chromium/aluminum alloys come under consideration as such a metal, with aluminum without chromium being especially preferred.

In accordance with yet another feature of the invention, there is provided a ceramic heat-insulating layer which covers the outside of the covering layer and, at each outlet orifice, also the enrichment layer on the small parts of the covering layer where the enrichment layer covers the covering layer.

In accordance with yet a further feature of the invention, the heat-insulating layer has a thickness of 100 $\mu$m to 500 $\mu$m, especially of 200 $\mu$m to 300 $\mu$m.

In accordance with yet an added feature of the invention, the product, particularly with one or more of the above-described preferred developments, is constructed as a gas turbine component, for example as a blade or a heat-shield element. Its actual features make it particularly apt to interpret it as being capable of withstanding the mechanical, thermal and chemical loads which are to be expected during operation in a gas turbine, in which case hot flue gas flows round the product.

With the objects of the invention in view, there is also provided a first version of a method for manufacturing a product, which comprises the following sequence of steps applying a metallic covering layer on a basic body having at least one longitudinal duct inside the basic body; boring or drilling transverse ducts through the basic body and the covering layer to the longitudinal duct and forming outlet orifices of the transverse ducts; applying an enrichment layer to the basic body in the longitudinal duct, in the transverse ducts and in each case on small parts of the covering layer at the outlet orifices; heat treating the basic body with the covering layer and with the enrichment layer; and smoothing the covering layer.

With the objects of the invention in view, there is additionally provided a second version of a method for manufacturing a product, which comprises the following sequence of steps applying a metallic covering layer on a basic body having at least one longitudinal duct inside the basic body; boring or drilling transverse ducts through the basic body and the covering layer to the longitudinal duct and forming outlet orifices of the transverse ducts; applying an enrichment layer to the basic body in the longitudinal duct, in the transverse ducts and in each case on small parts of the covering layer at the outlet orifices on the covering layer; smoothing the covering layer; applying a ceramic heat-insulating layer on the covering layer; and heat treating the basic body with the covering layer, with the enrichment layer and with the ceramic heat-insulating layer.

With regard to the first version of the method, it is noted that the smoothing of the covering layer serves particularly for removing a surface layer which has occurred at undesirable locations during the application of the enrichment layer and which is enriched with the material used for forming the enrichment layer. Regarding the second version of the method according to the invention, it is noted that the step of smoothing the covering layer is carried out according to the requirements of the ceramic heat-insulating layer to be applied, wherein an undesirable surface layer which has possibly occurred on the covering layer is once again removed.

Within the scope of the first version of the method, the covering layer constitutes, in particular, a protective layer which is to protect the basic body against corrosion and/or oxidation. Within the scope of the second version of the method, the covering layer serves particularly as an adhesive layer, in order to tie the ceramic heat-insulating layer to the basic body. This tying possibly takes place through a thin oxidic film occurring on the covering layer. This film may occur as a result of the oxidation of the covering layer and it may also be applied in a separate step. If appropriate, a film formed by the oxidation of the covering layer may also be modified before the application of the ceramic heat-insulating layer, in particular by the introduction of a further chemical element, such as, for example, nitrogen.

In accordance with another mode of the invention, within the scope of either version of the method, the covering layer can be applied through the use of a low-pressure plasma spraying method (LPPS) or a vacuum plasma spraying method (VPS). The vacuum plasma spraying method particularly is preferred for applying a covering layer composed of an MCrAlY alloy.

In accordance with a further mode of the invention, in order to apply the enrichment layer, at least one of the elements aluminum and chromium, and preferably aluminum, is vapor-deposited onto the basic body and diffused-in, so that the enrichment layer forms by the addition of aluminum or chromium to the material of the basic body or the covering layer.

In accordance with an added mode of the invention, the drilling of the transverse ducts in the basic body is carried out by a laser drilling method, an electrochemical countersinking method (ECM) or an electrical discharge method (EDM).

In accordance with an additional mode of the invention, if a heat-insulating layer is to be applied within the scope of the method, it is carried out through the use of an atmospheric plasma spraying method (APS) or a physical vapor deposition method (PVD). In this case, the plasma spraying method provides an essentially unstructured ceramic heat-insulating layer in an especially cost-effective way, whereas the vapor deposition method, which as a rule is more expensive than the spraying method, can provide a ceramic heat-insulating layer which is formed of individual columnar crystallites grown in each case on the covering layer. In comparison with an unstructured heat-insulating layer, such a columnar-crystalline heat-insulating layer has significant advantages. However, such advantages have to be acquired at the expense of markedly higher manufacturing costs. The choice between an unstructured and a columnar-crystalline heat-insulating layer must therefore be decided specially for each individual case.

In accordance with a concomitant mode of the invention, the heat treatment provided within the scope of each version of the method serves for solution annealing and/or hardening of the coated basic body.

A particular advantage of the invention is that the outer surface does not have to be covered while the internal coating is being applied. Moreover, the order of manufacture and the work steps, especially smoothing, which follow coating ensure that phases with an increased content of material of the enrichment layer, especially aluminum, do not occur or remain either between the component surface and the covering layer or on the covering layer. In particular, such phases are known to tend to form cracks. The formation of cracks can therefore largely be avoided.

The method according to the invention guarantees, moreover, that all of the transverse cooling ducts, that is to say all of the cooling-air outlet bores, are coated.

The enrichment layer is preferably applied by a CVD method (Chemical Vapor Deposition), in particular a diffusion process. This choice of the method for applying the internal coating keeps contamination of the outer surface low. Moreover, since the latter is formed of the still spray-rough covering layer which is preferably produced by the VPS (Vacuum Pressure Spraying) method or by the LPPS (Low Pressure Plasma Spraying) method, a complete removal of all undesirable residues can be achieved in the subsequent smoothing operation, which necessarily has to be an abrasive method (grinding process). Furthermore, the number of heat treatments can remain relatively small.

If the component is to acquire a heat-insulating layer, this must preferably be applied through the use of a PVD method (Physical Vapor Deposition).

The products described above each have a relatively long life as turbine components.

In terms of the order of manufacture, the advantage of the manufacturing method is that the transverse ducts, that is to say the cooling-air bores, are not closed, but are only narrowed in a closely reproducible manner. This can be demonstrated in the construction of a component to the size of the drawing.

Other features which are considered as characteristic for the invention are set forth in the appended claims.

Although the invention is illustrated and described herein as embodied in a product with a metallic basic body and a method for manufacturing a product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
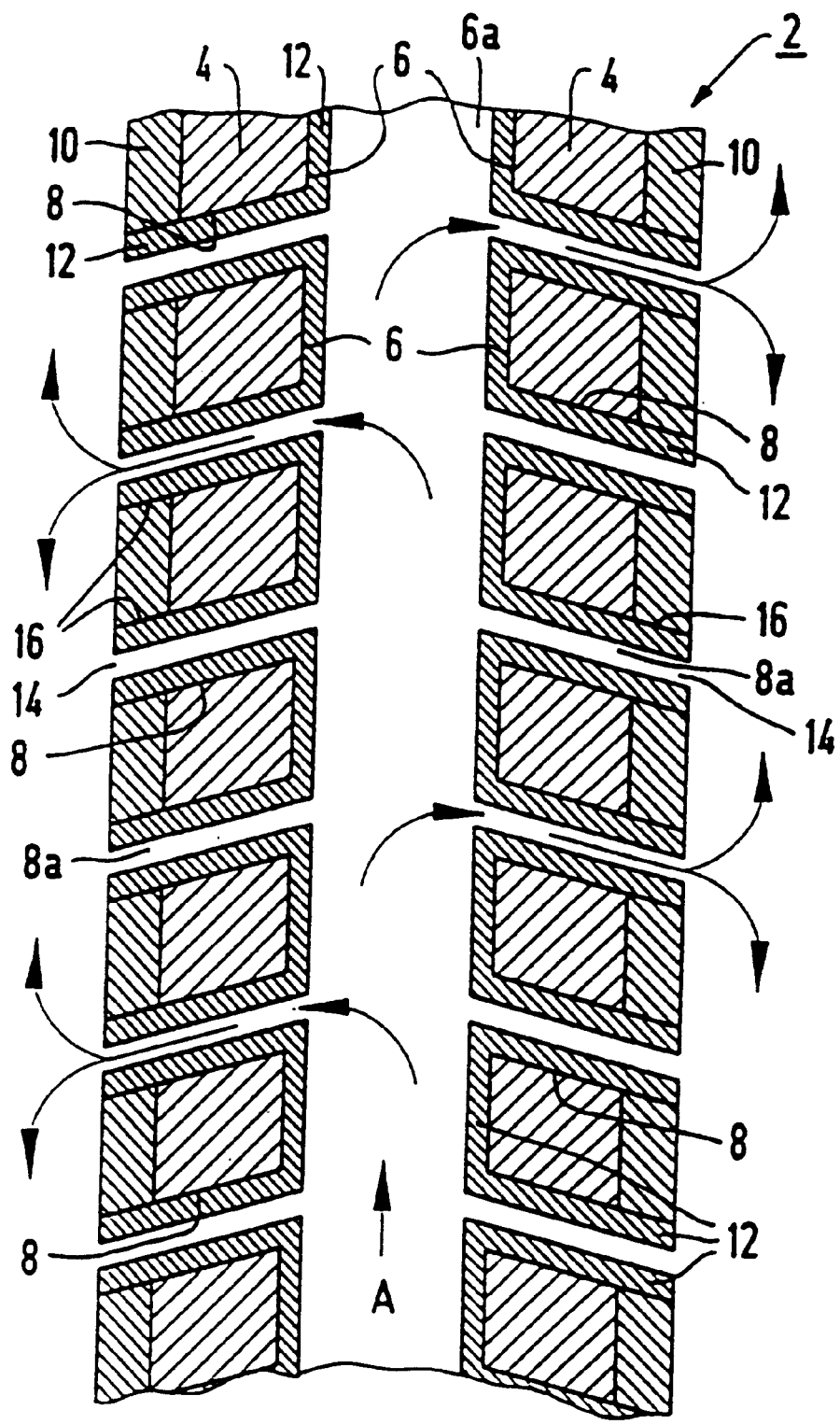
FIG. 1 is a fragmentary, diagrammatic, sectional view of a gas turbine blade without an outer heat-insulating layer.

Referring now to the figures of the drawings in detail and first, particularly, to FIG. 1 thereof, there is seen a blade 2 for a gas turbine having a metallic basic body 4. The basic body 4 can, in particular, be one which is formed of a nickel-based or cobalt-based superalloy. A longitudinal duct 6 is located approximately centrally inside the basic body 4. A number of transverse ducts 8 branch off from this longitudinal duct 6. As will become clear below, after internal coating, the longitudinal duct 6 and the transverse ducts 8 serve for the conduction of a cooling medium A, especially a cooling gas, such as air.

In each case a covering layer 10 is applied directly externally on each side of the basic body 4. This covering layer 10 is formed of an MCrAlY alloy and it preferably has a thickness of 180 $\mu$m to 300 $\mu$m. Outlet orifices 14 are at the same time left free. The covering layer 10 is preferably applied through the use of a low-pressure plasma or vacuum plasma spraying method in each case and it performs the function of an (outer) protective layer.

In order to provide an internal coating, an enrichment layer 12 is provided. This layer covers not only walls of the longitudinal duct 6 and walls of the transverse ducts 8. On the contrary, it is also located in an outer region of the transverse ducts 8, leaving the outlet orifices 14 free, and at the same time it laterally covers a small part of the covering layer 10. This covered part is designated by reference symbol 16. The enrichment layer 12 preferably has a thickness of 30 $\mu$m to 100 $\mu$m. The enrichment layer is preferably applied through the use of a diffusion method, in which chromium and/or aluminum is vapor-deposited and diffused in.

It is evident that the blade 2 thus has a coated longitudinal cooling duct 6a and a number of coated transverse cooling ducts 8a branching off from the latter, for the cooling medium A to flow through.

Figure 2:
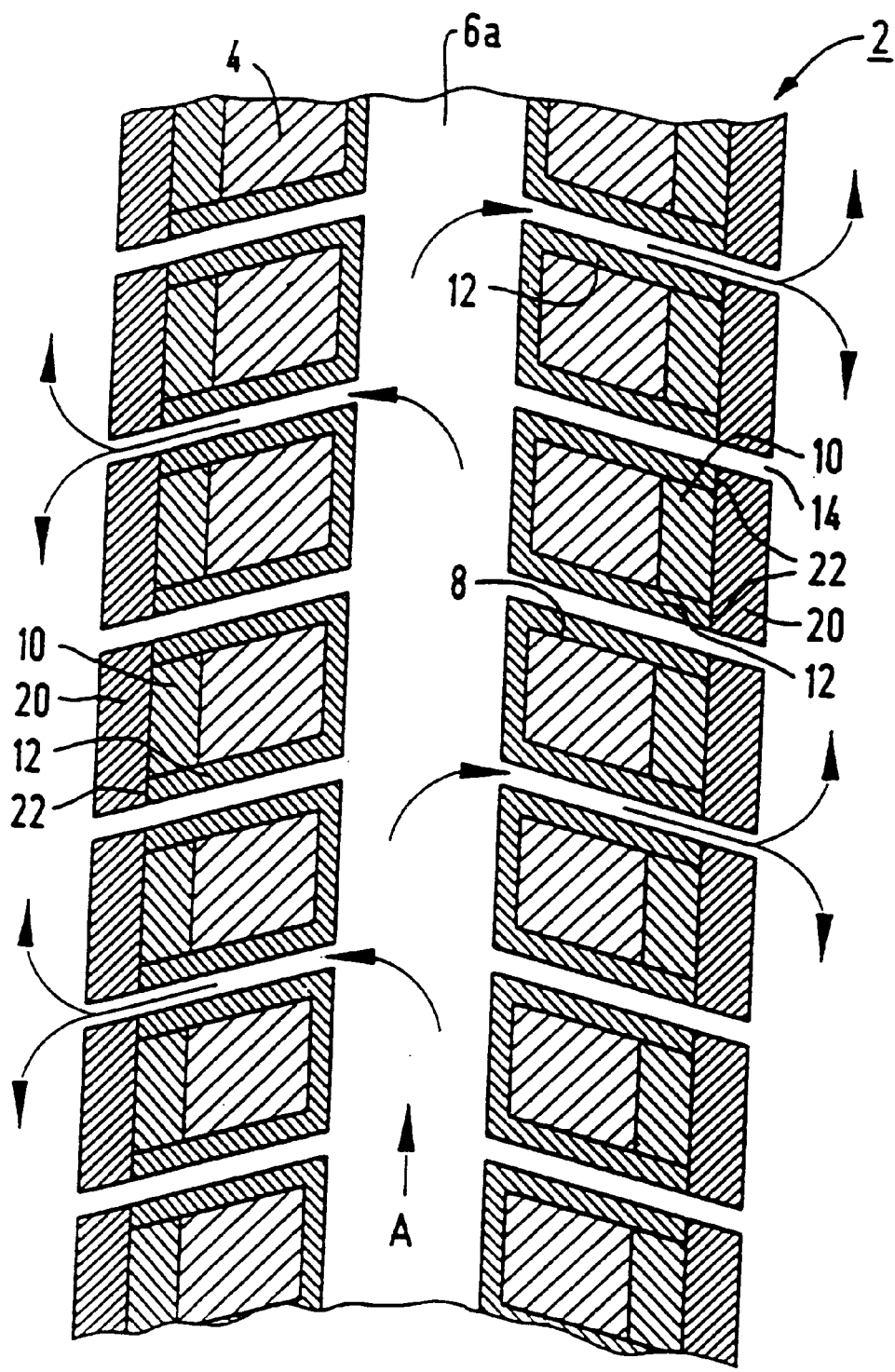
FIG. 2 is a view similar to FIG. 1 of a gas turbine blade with an outer heat-insulating layer.

The blade 2 of FIG. 2 largely corresponds to that of FIG. 1. In this case, however, a ceramic heat-insulating layer 20 is also provided on the outside, that is to say on the covering layer 10. The covering layer 10, which once again preferably is formed of MCrAlY, serves the function of an adhesive layer in this case. The heat-insulating layer 20 has a thickness of 100 μm to 500 μm and preferably a thickness of 200 μm to 300 μm and it can be formed of one of the conventional known materials. It is noteworthy that the heat-insulating layer 20 covers the covering layer 10 on the outside and an outer region of the transverse ducts 8, leaving the outlet orifices 14 free, as well as a small part or overlap region 22 of the enrichment layer 12. The heat-insulating layer 20 can be applied through the use of an atmospheric plasma spraying method (APS) or through the use of a physical vapor-deposition method (PVD).

Figure 3:
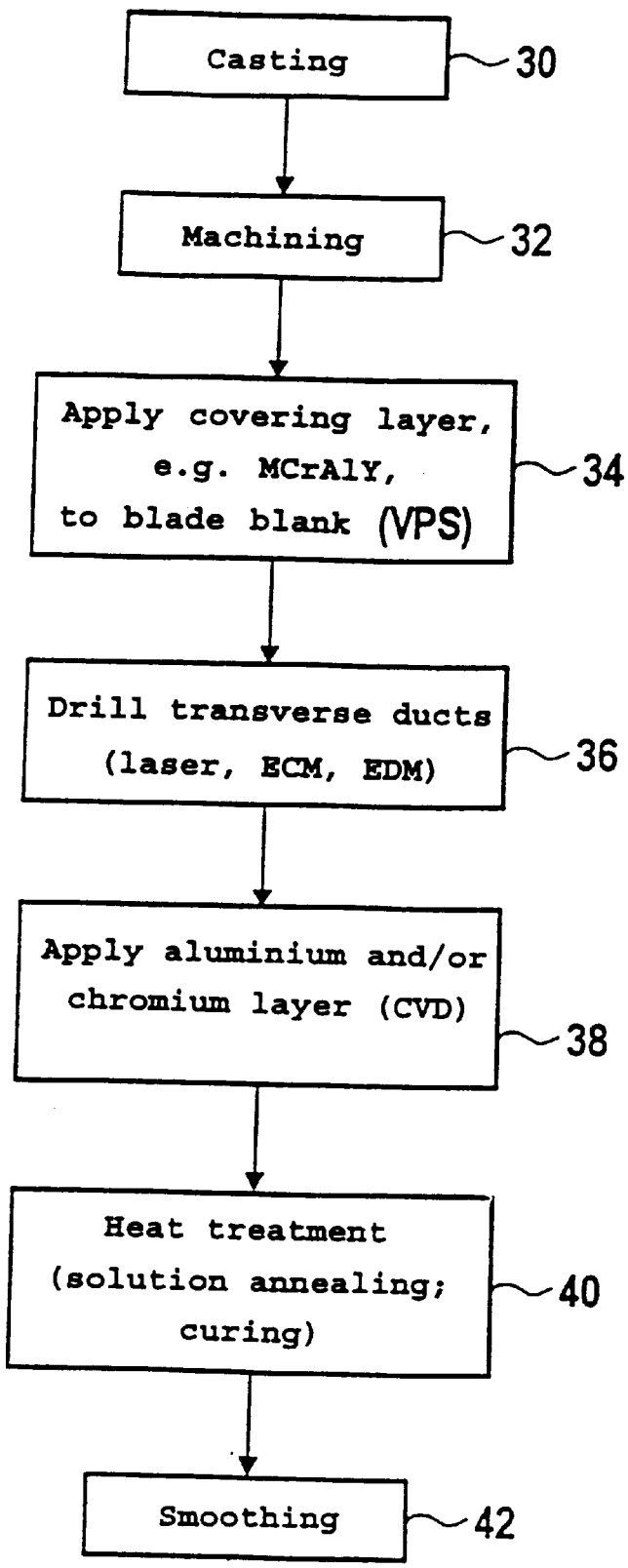
FIG. 3 is a flow diagram for the manufacture of a gas turbine blade according to FIG. 1.

FIG. 3 shows a basic procedure for manufacturing a blade 2 according to FIG. 1. According to FIG. 3, initially casting, that is to say the manufacture of the shaped basic body 4 including the longitudinal duct 6, takes place in a first step 30. A plurality of longitudinal ducts 6 can also be provided. Mechanical machining is carried out in a second step 32. In this case, milling of a blade root, milling of sealing surfaces of the blade 4 and/or another machining step are carried out, so that a blank is obtained. In the next step 34, an application of the covering layer 10 on the basic body 4 takes place. This covering layer 10 can be formed particularly of an MCrAlY alloy. The application is carried out through the use of a low-pressure or vacuum plasma spraying method (Low Pressure Plasma Spraying=LPPS or Vacuum Plasma Spraying=VPS). At the same time, if appropriate, the blank is subjected to tying heat treatment. The covering layer 10 serves as a protective layer while the blade 2 is in operation.

In the next step 36, drilling or boring of the transverse ducts 8 is carried out. Various technologies can be utilized for this purpose. If they are ducts 8 with a round cross-section and feed conduits to shaped outlet orifices, laser machining can be carried out. In contrast, if they are film-cooling bores which are, for example, trapezoidal or otherwise shaped in cross-section, an electrochemical countersinking method (Electro Chemical Milling=ECM) or electrical discharge countersinking (Electrical Discharge Milling=EDM) can be employed. This is followed by step 38, specifically internal coating. This involves the application of the enrichment layer 12. This application can be carried out, for example, through the use of a reactive gas according to a diffusion process (Chemical Vapor Deposition=CVD) or according to a powder packing method with a subsequent diffusion process. It was already pointed out at the outset that such methods are known per se.

After the basic body 4 has therefore acquired its metallic external and internal coating 10, 12, it is delivered for heat treatment in a step 40. This step 40 is necessary so that the material of the basic body 4 acquires its optimum material properties. This step 40 involves, in particular, solution annealing and subsequent hardening. In the next step 42, the roughness of the then finished blade 4 is eliminated. This is carried out through the use of the mechanical process of smoothing. In this case, residues on the surface of the covering layer 10 are also removed, as a result of which, for example, the initiation of cracking by brittle aluminum-rich phases is avoided.

Figure 4:
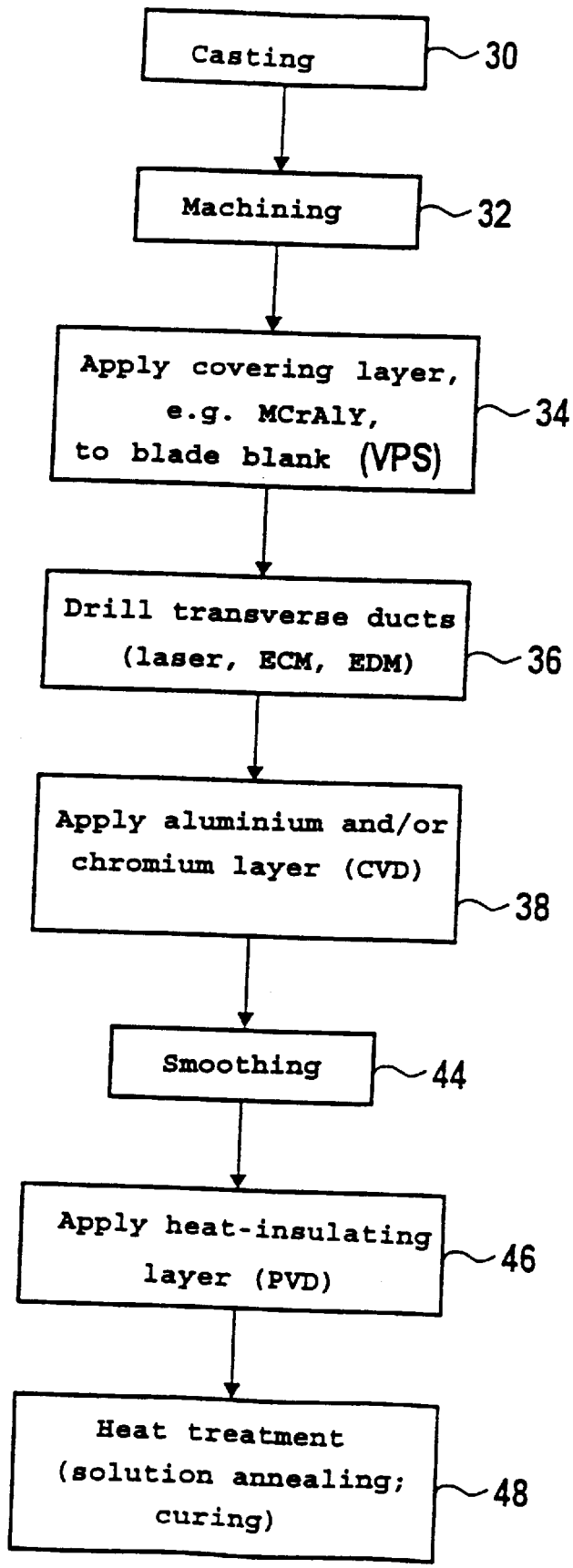
FIG. 4 is a flow diagram for the manufacture of a gas turbine blade according to FIG. 2.

In FIG. 4, steps 30 to 38 correspond to steps 30 to 38 of FIG. 3. A repeated description is therefore dispensed with.

In FIG. 4, step 38 is followed by a step 44 of mechanical smoothing. In this case, the surface is prepared for the following application of the heat-insulating layer 20 in a step 46.

In the step 46, the application of the heat-insulating layer 20 is carried out, specifically through the use of a vapor-deposition process. In order to provide for this, the electron-beam vapor-deposition process (Electron Beam Physical Vapor Deposition=EB-PVD) is preferably employed. Whereas the blade 2, as manufactured according to FIG. 3, has a metallic surface towards the outside, the blade 2 according to FIG. 4 has a ceramic surface towards the outside.

Step 46 is followed by a step 48 for heat treatment (according to step 40 of FIG. 3). In this case too, this involves a solution annealing and curing of the basic material of the blade 2. After this step 48, the blade 2 according to FIG. 2 is available for use.

We claim:

1. A method for manufacturing a product, which comprises the following sequence of steps:
    a) applying a metallic covering layer on a basic body having at least one longitudinal duct inside the basic body;
    b) boring transverse ducts through the basic body and the covering layer to the longitudinal duct and forming outlet orifices of the transverse ducts;
    c) applying an enrichment layer to the basic body in the longitudinal duct, in the transverse ducts and on small parts of the covering layer at the outlet orifices;
    d) heat treating the basic body with the covering layer and with the enrichment layer; and
    e) smoothing the covering layer.

2. The method according to claim 1, which comprises applying the covering layer by a low-pressure plasma spraying method.

3. The method according to claim 1, which comprises applying the covering layer by a vacuum plasma spraying method.

4. The method according to claim 1, which comprises vapor-depositing and diffusing-in at least one element selected from the group consisting of aluminum and chromium, for the application of the enrichment layer.

5. The method according to claim 1, which comprises vapor-depositing and diffusing-in aluminum, for the application of the enrichment layer.

6. The method according to claim 1, which comprises performing the step of boring the transverse ducts with a boring method selected from the group consisting of a laser drilling method, an electrochemical countersinking method and an electrical discharge method.

7. The method according to claim 1, which comprises performing the heat treatment by at least one of solution annealing and hardening.

8. A method for manufacturing a product, which comprises the following sequence of steps:
    a) applying a metallic covering layer on a basic body having at least one longitudinal duct inside the basic body;
    b) boring transverse ducts through the basic body and the covering layer to the longitudinal duct and forming outlet orifices of the transverse ducts;
    c) applying an enrichment layer to the basic body in the longitudinal duct, in the transverse ducts and on small parts of the covering layer at the outlet orifices;

d) smoothing the covering layer;

e) applying a ceramic heat-insulating layer on the covering layer; and f) heat treating the basic body with the covering layer, with the enrichment layer and with the ceramic heat-insulating layer.

9. The method according to claim 8, which comprises applying the heat-insulating layer by an atmospheric plasma spraying method.

10. The method according to claim 8, which comprises applying the heat-insulating layer by a physical vapor-deposition method.

11. The method according to claim 8, which comprises applying the covering layer by a low-pressure plasma spraying method.

12. The method according to claim 8, which comprises applying the covering layer by a vacuum plasma spraying method.

13. The method according to claim 8, which comprises vapor-depositing and diffusing-in at least one element selected from the group consisting of aluminum and chromium, for the application of the enrichment layer.

14. The method according to claim 8, which comprises vapor-depositing and diffusing-in aluminum, for the application of the enrichment layer.

15. The method according to claim 8, which comprises performing the step of boring the transverse ducts with a boring method selected from the group consisting of a laser drilling method, an electrochemical countersinking method and an electrical discharge method.

16. The method according to claim 8, which comprises performing the heat treatment by at least one of solution annealing and hardening.

* * * * *